United States Patent
Schreck et al.

(10) Patent No.: US 6,297,490 B1
(45) Date of Patent: Oct. 2, 2001

(54) METHOD AND APPARATUS FOR DETERMINING THE CENTRE PHOTODETECTOR IN A DIGITAL SCINTILLATION CAMERA

(75) Inventors: Zoltan Schreck, Ville de Lery; Iain Stark, Manotick, both of (CA)

(73) Assignee: 152 Research Inc., Nepean (CA)

( * ) Notice: Subject to any disclaimer, the term of this patent is extended or adjusted under 35 U.S.C. 154(b) by 0 days.

(21) Appl. No.: 09/325,574

(22) Filed: Jun. 4, 1999

(51) Int. Cl.$^7$ .................................................. G01T 1/20
(52) U.S. Cl. ........................................ 250/207; 250/369
(58) Field of Search ..................................... 250/207, 328, 250/366, 369, 363.01, 363.02, 363.07, 363.09

(56) References Cited

U.S. PATENT DOCUMENTS

| | | | |
|---|---|---|---|
| 3,721,824 | * 3/1973 | Bristol | 250/369 |
| 5,293,044 | * 3/1994 | Klingenbeck-Regn et al. | 250/369 |
| 5,309,357 | 5/1994 | Stark et al. | 364/413.24 |
| 5,446,287 | 8/1995 | Schreck et al. | 250/369 |
| 5,508,524 | 4/1996 | Goldberg et al. | 250/369 |
| 5,519,224 | * 5/1996 | Mattern | 250/369 |
| 5,576,546 | * 11/1996 | Gagnon | 250/369 |

\* cited by examiner

Primary Examiner—John R. Lee

(57) ABSTRACT

A method and apparatus for determining the centre photodetector in a planar array of photodetectors of a gamma scintillation camera is provided. The analog signals generated by a plurality of photomultiplier tubes (PMT) following a scintillation event, are digitized, integrated, and stored in a first memory. A first comparison means is used to divide the set of PMT logical signals into groups. Each group comprises an arbitrary number of PMTs. The PMT logical signals within a group are combined into pairs and compared to select the highest intensity value for each individual group. Subsets of local PMT highest intensity values are created. A second comparison means is used to receive the subsets of local PMT highest values, combine them into pairs, compare the paired signals, and record the selected signals in a second memory, until a PMT with the maximum intensity value or a centre PMT is obtained. The data stored during processing are then arranged in a versatile look up table to facilitate the assembly of relevant information characterizing the distribution of scintillations around the centre photodetector.

11 Claims, 4 Drawing Sheets

METHOD AND APPARATUS FOR DETERMINING THE CENTRE PHOTODETECTOR IN A DIGITAL SCINTILLATION CAMERA

FIELD OF THE INVENTION

The present invention relates generally to digital scintillation cameras, and more particularly to a method and apparatus for determining which photodetector in a planar array of photodetectors has received the most light from a scintillation event in a digital electronic scintillation camera.

BACKGROUND OF THE INVENTION

In the human body, increased metabolic activity is associated with an increase in emitted radiation. In the field of nuclear medicine, increased metabolic activity within a patient is detected using a radiation detector such as a scintillation camera.

Scintillation cameras are well known in the art, and are used for medical diagnostics. A patient ingests, or inhales or is injected with a small quantity of a radioactive isotope. The radioactive isotope emits photons that are detected by a scintillation medium in the scintillation camera. The scintillation medium is commonly a sodium iodide crystal or other suitable crystal. The scintillation medium emits a small flash or scintillation of light, in response to stimulating radiation, such as from a patient. The intensity of the scintillation of light is proportional to the energy of the stimulating photon, such as a gamma photon. Note that the relationship between the intensity of the scintillation of light and the gamma photon is not entirely linear.

A conventional scintillation camera such as a gamma camera includes a detector which converts into electrical signals gamma rays emitted from a patient after radioisotope has been administered to the patient. The detector includes a scintillator and photomultiplier tubes. The gamma rays are directed to the scintillator which absorbs the radiation and produces, in response, a very small flash of light. An array of photodetectors, which are placed in optical communication with the scintillation crystal, converts these flashes into electrical signals which are subsequently processed. The processing enables the camera to produce an image of the distribution of the radioisotope within the patient.

Gamma radiation is emitted in all directions and it is necessary to collimate the radiation before the radiation impinges on the crystal scintillator. This is accomplished by a collimator which is a sheet of absorbing material, usually lead, perforated by relatively narrow channels. The collimator is detachably secured to the detector head, allowing the collimator to be changed to enable the detector head to be used with the different energies of isotope to suit particular characteristics of the patient study. A collimator may vary considerably in weight to match the isotope or study type.

The determination of the centre photodetector in a scintillation camera is an important function if the intensity signals are to be processed digitally. Since the majority of scintillation cameras at the present use digital processing naturally they are various methods developed to achieve this purpose. Examples are U.S. Pat. No. 5,508,524 and U.S. Pat. No. 5,446,287. It is of great importance to execute this task as fast as possible since the time required to execute the task will to a great extent determine the dead time and therefore the overall throughput or maximum count rate of the system.

Thus, there is a need for an apparatus and a method for sorting intensity values received from a plurality of photodetector multiplying tubes (PMTs) according to their magnitude as well as to determine the identity of the PMT with the maximum intensity value.

SUMMARY OF THE INVENTION

There is an object of the present invention to provide an improved method and apparatus for determining which photodetector in a planar array of photodetectors has received the most light from a scintillation event in a digital electronic scintillation camera.

The photo multiplier tube (PMT) having the highest intensity value, is considered to be the centre photodetector which is nearest to the point of scintillation. It is a further object of the present invention to provide the intensity value and the identity of the centre PMT having the maximum intensity value to generate a data packet used for further processing.

According to a further aspect of the present invention, there is provided a method for determining a centre photo multiplying tube (PMT) from a plurality of PMTs, each PMT for receiving scintillation light and generating an analog signal, the PMTs being arranged in a planar array and outputting a set of PMT analog signals indicative of a scintillation event received from a target area. The method comprises the steps of converting the set of PMT analog signals into a set of PMT logical signals; recording in a look up table the set of PMT logical signals; dividing the plurality of PMTs into groups; forming pairs of logical signals within said groups; successively comparing paired logical signals of individual groups and outputting a local PMT highest intensity value for each of the groups so as to obtain a subset of local PMT highest intensity values; and repeating the comparison for the subset of local PMT highest intensity values until a PMT maximum intensity value representing the centre PMT is obtained.

According to a further aspect of the present invention, there is provided an apparatus for determining a centre PMT, from a plurality of PMTs. Each PMT receives scintillation light and generates an analog signal. The PMTs are arranged in a planar array generate a set of PMT analog signals indicative of the scintillation event received from a target area. The apparatus comprises means for converting the set of PMT analog signals into a set of PMT logical signals; a look up table for storing the set of PMT logical signals; means for dividing the set of PMT logical signals into groups; first comparison means for successively receiving groups of logical signals and combining them into pairs, comparing the paired signals and outputting a local PMT highest intensity value for each individual group so as to obtain a subset of local PMT highest intensity values; second comparison means for receiving the subset of local PMT highest intensity values, combining the subset of local PMT highest intensity values into pairs, comparing the values of the pairforming signals and outputting the highest intensity values, until a PMT maximum intensity value representing said centre PMT is found.

Advantageously, the hardware solution of the present invention provides for a reduced dead time since it allows for more than one comparison to be performed simultaneously. In addition, the use of a look up table the determination of the PMT identity is accurate and requires less hardware than the prior art methods using tagging or counting.

BRIEF DESCRIPTION OF THE DRAWINGS

Other aspects and features of the present invention will become apparent to those ordinarily skilled in the art upon review of the following description of specific embodiments of the invention in conjunction with the accompanying figures in which:

FIG. 1A is a block diagram of the of the timer and controller used by the embodiment of FIG. 1;

FIG. 2A is a block diagram of the ID number encoder used during the stage-2 of data processing.

Figure 1:
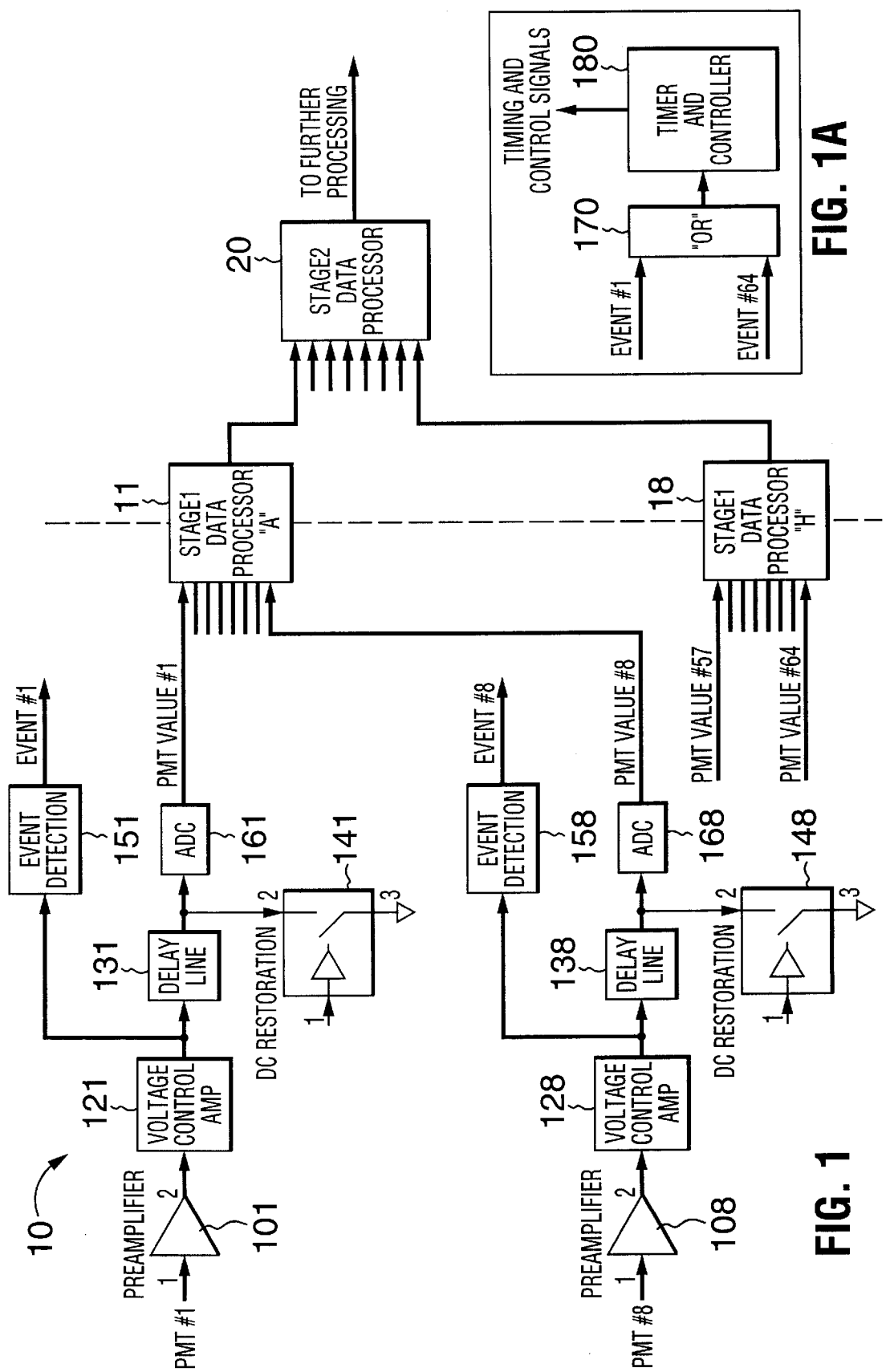
FIG. 1 is a schematic block diagram of an embodiment of the present invention in which the target area is divided in 8 zones, each zone including 8 PMTs.

Similar references are used in different figures to denote similar components.

DETAILED DESCRIPTION OF THE PRESENTLY PREFERRED EMBODIMENT

According to the invention, there is provided an apparatus for processing signals generated by the PMTs until determining the PMT signal having the highest intensity value for a target area serviced by a planar array of PMTs. The analog signals generated by the photodetectors are continuously converted into binary numbers at a rate of 20 M sample/sec or higher. After the detection of a scintillation event the stream of binary numbers are added and accumulated (i.e. integrated) for the duration of the scintillation pulse. As a result, a binary number is obtained for each photodetector (PMT1 . . . . PMTk) the magnitude of which is proportional to the extent the photodetector was affected by the scintillation event. The photodetectors are then arbitrarily divided into groups and within each group the photodetector with the local highest intensity value is determined by a tree of comparators and multiplexers, so as to form subsets of local highest intensity values.

The maximum intensity value among the subsets of local highest intensity values is then determined by a second tree of comparators and multiplexers the result of which is the maximum value of the whole planar array. By storing the results of the comparators and applying the stored values combined with the partial values obtained for the groups in a truth table a binary number identifying the photodetector with the maximum value can be easily found.

The number identifying the photodetector with the maximum value is applied as an offset to a Look Up Table in which the identification numbers of each photodetector and the list of their neighbors, likely to be affected by a scintillation event in which the photodetector was the centre, is generated. Usually, six or nineteen or some other number neighbors are listed.

As mentioned before, the photodetectors of the planar array are arbitrarily divided into groups. Within each group, the members of the groups are combined in pairs and their intensity values are compared using a first level comparators which, in turn, produce control, outputs expressed as binary numbers. If the compared intensity values are designated as a and b, respectively, the output of the comparator is 0 when a <=b and 1 if a >b. The control outputs are applied to a first level multiplexers causing the greater of the values of a and b to appear on their outputs. The selected values on the outputs of the first level multiplexers are again formed into pairs and the process is repeated through a second level comparators and multiplexers. The process is repeated until a local highest intensity value for each group is determined, such that subsets of local highest values are generated.

A subset of local highest intensity values is then considered a new group and the process described above is performed on the new group until the PMT maximum intensity value of the plurality of intensity values is obtained.

The invention will be now explained by way of example only. As shown in the Figures, the size of the groups in a preferred embodiment is selected to be eight or less, but other group size is also possible. During the process, the values selected by first level of processing unit 10 or by the second level of processing unit 20, are stored in registers 280, 360, 370, and the stored data are then arranged in a look up table 380 to provide a binary number in the range of 0–7 identifying the PMT with the maximum intensity value.

As shown in FIG. 1, each photodetector from a planar array PMT 1 to PMT 63 is connected, after preamplifier 101–108, to a voltage control amplifier 121–128. The gain of these amplifiers, under the control of a master CPU, are set to values compensating for short term and long term variations in the gain of the photodetectors PMT1–PMT63. A scintillation event is detected by the event detection circuits 151–158, if any of the outputs of the voltage control amplifiers 121–128 exceed a preset value. The outputs of the voltage control amplifiers 121–128 are then delayed before being applied to DC restoration switches 141–148 and to analog to digital converters (ADCs) 161–168 to compensate for the time required for the detection of an event and for the DC restoration. ADCs 161–168 continuously convert the set of PMT analog signals present at the outputs of the delay lines 131–138 at a rate of 20 M sample/sec for generating a set of PMT logical signals.

When a scintillation event is detected, a timer and controller subunit 180 shown in FIG. 1A, generates a series of control signals including one controlling the DC restoration switches 141–148, and an other controlling the integration of the digitized PMT 1–PMT63. Between events, controller 180 counts a dead time representing the minimum acceptable time before the next scintillation event may be accepted by the system.

The outputs of the ADCs 161–168 are arbitrarily divided into groups of eight signals and each group is applied as inputs to one of eight first stage data processors 11–18. In the preferred embodiment the groups are formed as PMT1–8, PMT9–16, etc. but any other grouping is possible. Also, the number of groups need not be precisely eight, and any group can consists of less than eight signals.

Figure 2:
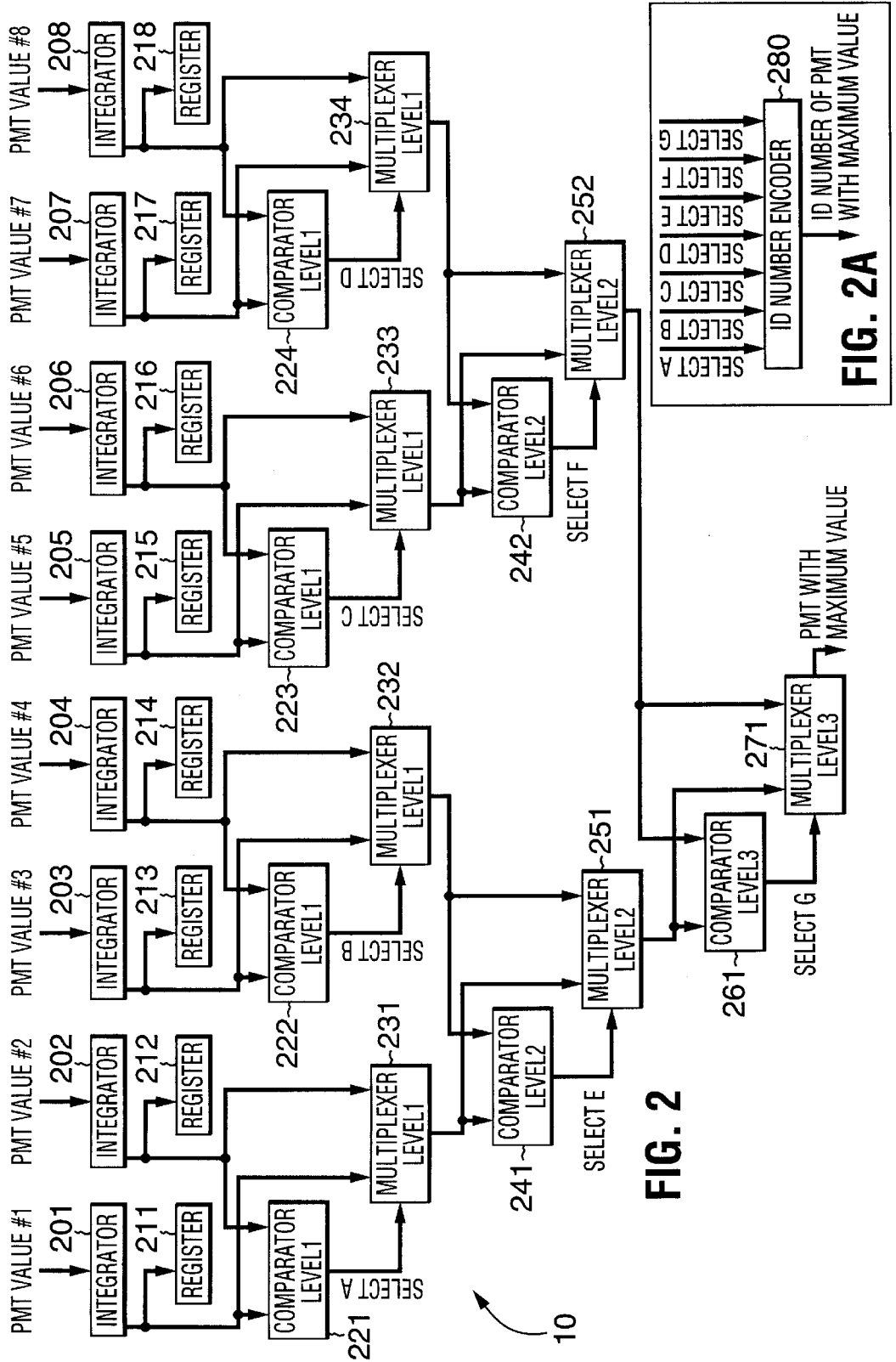
FIG. 2 is a block diagram of the stage-1 data processor used by the embodiment of FIG. 1.

FIG. 2 shows the functional block diagram of a first level processing unit 10. In the preferred embodiment the first level processing unit 10 is implemented by using a device of the Altera 10K family. However, implementation is possible by using any field programmable gate array (FPGA) or complex programmable logic device (CPLD) of sufficient speed and capacity or any other appropriate technology.

As illustrated in FIG. 2, the first step in the processing the stream of binary numbers representing a set of PMT logical signals are added and accumulated (integrated) under the control of the timer and controller 180. The integrated signals are binary numbers proportional to the analog signals present on the outputs of the photodetectors PMT1–PMT63. The entire set of these integrated signals is then stored in registers 211–218 as they become available. The eight signals forming the group are divided into four pairs. Each pair of signals is applied to a level 1 comparator 221–224. The outputs of the comparators is then applied as select signals to corresponding level 1 multiplexers 231–234 in such a manner that the greater of the two signals a and b will to appear on the outputs of the multiplexers and the values of the select signals are stored. As shown in FIG. 2A, all select signals are stored in an identification (ID) number encoder 280.

In a similar fashion the four outputs of the level 1 multiplexers 231–234 are divided into two pairs and applied to level 2 comparators 241, 242, and level 2 multiplexers 251, 252, and finally the two outputs of the level 2 multiplexers 251, 252, are applied to a level 3 comparator 261 and corresponding level 3 multiplexer 271. The output of the level 3 comparator 271 represents the highest of the eight numbers forming the group of eight. The signals selected by all comparators are stored. The stored values selected by the comparators uniquely define the identification number of the PMT signal with the maximum value when presented in the form of a truth table.

First level processing unit 10 works synchronously, each level of processing requiring one cycle of the 20 MHZ system clock. Other clock speeds, or asynchronous implementation is also possible.

The invention also takes advantages of the possibility of pipelining, i.e. overlapping processing steps, and thereby increasing throughput. Once the results of the first level processing unit 10 are transferred to the second level processing unit 20, first level processing unit 10 is freed to start processing scintillation event (t+1) while the second level processing unit 20 completes the processing of scintillation event (t). Other pipelining arrangements are also possible. For instance each level of comparisonlmultiplexing can form a stage in pipelining speeding up the processing even more. The amount of overlapping, that is the number of stages of the pipeline can vary. More stages mean faster execution of the process.

Figure 3:
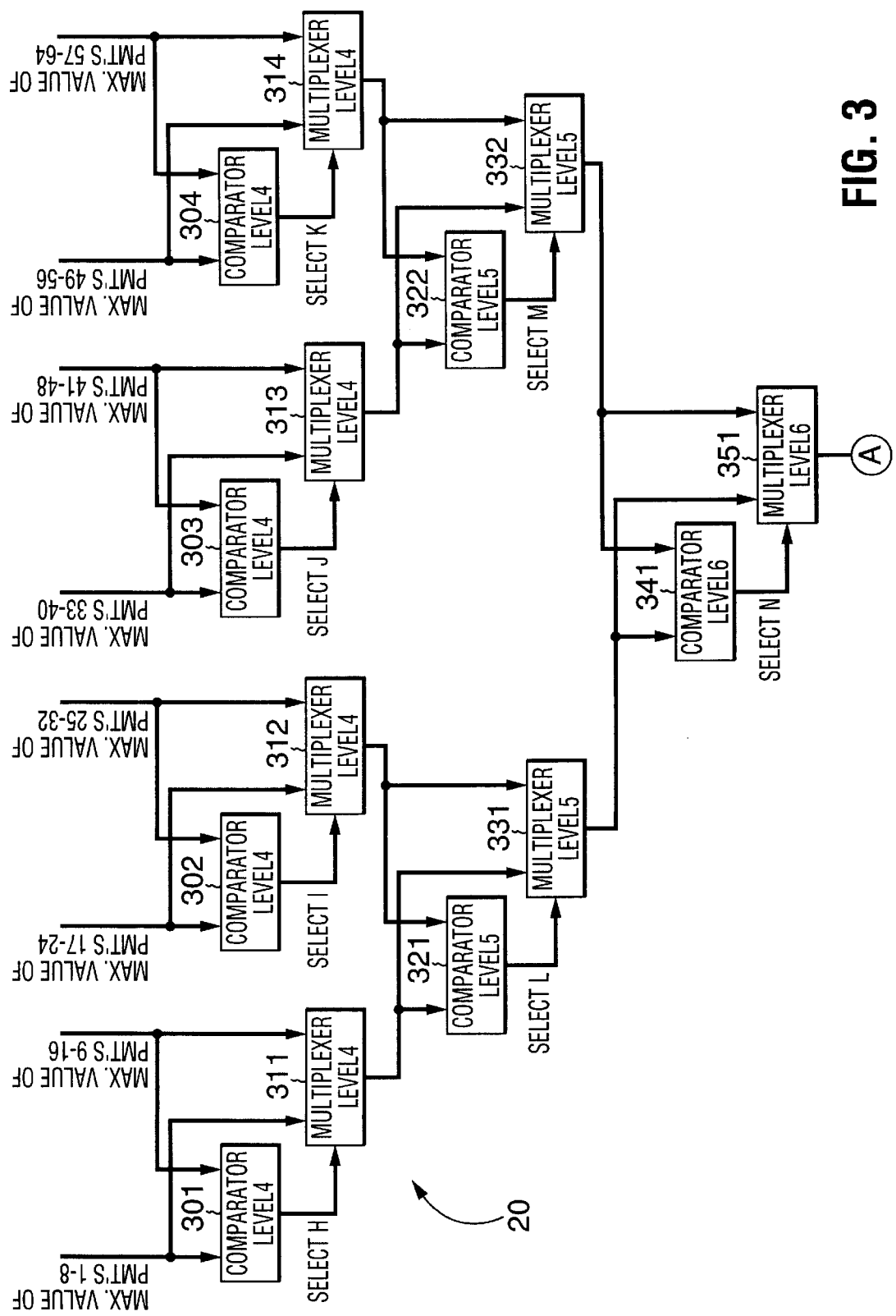
FIG. 3 is a functional block diagram of the stage-2 processor and the data packets assembler in accordance with the embodiment of FIG. 1.
Figure 3:
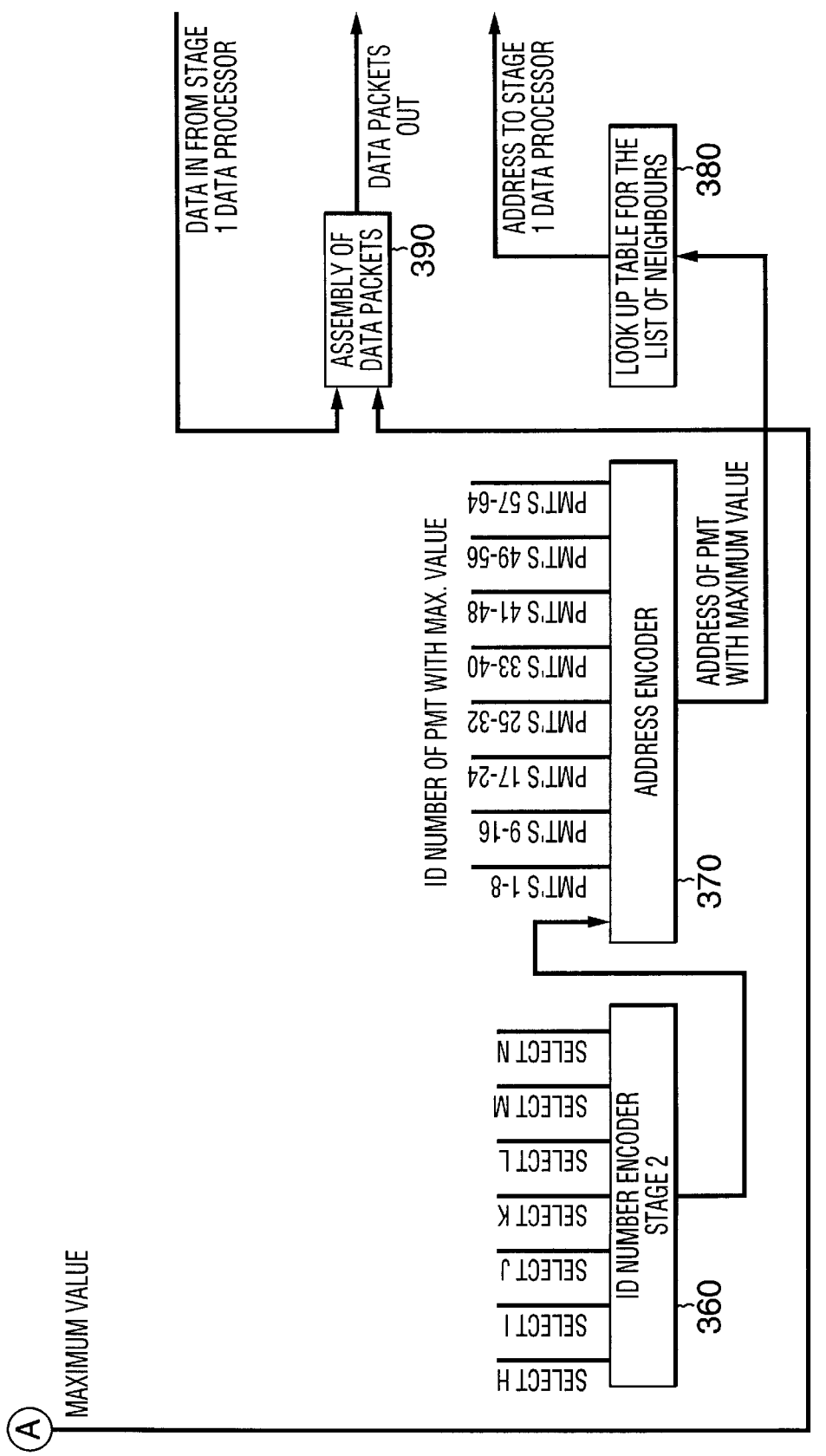

FIG. 3 shows the functional block diagram of the second level processing unit 20. In the preferred embodiment the Stage 2 Data Processor is implemented by using a device of the Altera 10K family. However, implementation is possible by using any FPGA or CPLD device of sufficient speed and capacity or any other appropriate technology.

The second level processing unit 20 receives up to eight local PMT highest intensity values and identification numbers for the photodetectors which produced these highest values. Similarly to the process described in connection with the first level processing unit 10 the eight values are divided into pairs and applied to a level 4 comparators 301–304 and corresponding level 4 multiplexers 311–314 for selecting the greater of the two inputs. The outputs of the level 4 multiplexers 311–314 are paired and applied to level 5 comparators 321, 322, and level 5 multiplexers 331, 332, and finally the two outputs of the level 5 multiplexers 331, 332, are applied to a level 6 comparator 341 and level 6 multiplexer 351. The output of the level 6 multiplexer 351 represents the PMT maximum intensity value or the centre PMT.

Through Level 4 to Level 6 processing the values of the comparators are stored in a second memory 360 and these stored values, together with identification numbers received during the first level of data processing 10, and stored in a first memory 370, uniquely identify the photodetector with the maximum value, i.e. the centre photodetector, when presented in a truth table 380.

The identification number of the centre photodetector is used as an offset into a Look Up Table (LUT) 380. The LUT 380 contains groups of identification numbers, each group consisting of the identification number of a photodetector followed by a list of other photodetectors (neighbors) which might be affected if a scintillation event occurs near the centre photodetector leading the group. Each photodetector in the planar array has such an associated 18 list. The number of neighbors in a group depends on the application. Typically six, or nineteen neighbors are listed.

The identification number of the centre photodetector points to the group in the LUT 380 associated with the centre photodetector. Using the list of identification numbers in LUT 380, the intensity values of the centre photodetector and intensity values of its neighbors are retrieved from the first level of data processing 10 and assembled in assembler 390 into data packets. Data packets of a predetermined format are transmitted to other parts of the system, e.g. and array of Digital Signal Processors or a Mathematical Engine, for further processing. In the preferred embodiment the data packet consists of the identification number of the centre photodetector, its intensity value, and the intensity values of its neighbors in the predefined order. Other formats for data packets are possible.

By properly selecting its entries the LUT 380 can also be used to compensate for some undesirable effects of special periphery conditions such as those for instance which exist at the edges of the planar array of photodetectors. In the preferred embodiment the identification numbers of the periphery photodetectors located on the edges of the planar array are replaced by those next to them and disposed toward the centre of the planar array. This results in a more accurate processing.

The present invention is directed to a method and apparatus for determining the centre photodetector using a tree of comparison and multiplexing circuitry which yields the maximum intensity value of a target area. Furthermore, by recording the results outputted by the comparators, identification of the centre photodetector is easily determined. Finally, a versatile Look Up Table facilitates the assembly of all relevant information characterizing the distribution of a scintillation event around the centre photodedector. The method can be easily implemented with hardware as it requires only eight inputs and the dead time between events is considerably reduced.

While the present invention has been described in connection with what is presently considered to be the most practical and preferred embodiments, it is to be understood that the invention is not limited to the disclosed embodiments. To the contrary, the present invention is intended to cover various modifications, variations, adaptations and equivalent arrangements included within the spirit and the scope of the appended claims. The scope of the claims is to be accorded the broadest interpretation so as to encompass all such modifications and equivalent structures and functions.

What is claimed is:

1. A method for determining a centre photo multiplying tube (PMT) from a plurality of PMTs, each said PMT for receiving scintillation light and generating an analog signal, said PMTs arranged in a planar array and outputting a set of PMT analog signals indicative of a scintillation event, the method comprising the steps of:

a) converting said set of PMT analog signals into a set of PMT logical signals;
   b) dividing said plurality of PMTs into groups;
   c) forming pairs of said logical signals within said groups;
   d) comparing said paired logical signals of said groups and determining subsets of select signals and outputting a local PMT highest intensity value for each said groups so as to obtain a subset of local PMT highest intensity values; and e) repeating steps b) to d) for each said subset of local PMT highest intensity values until a PMT maximum intensity value representing said centre PMT is obtained.

2. The method of claim 1, further comprising a step of defining a PMT maximum intensity value identification number of the PMT signal with the maximum value.

3. The method of claim 2, further comprising the step of:

storing said set of PMT logical signals, said select signals, and said PMT maximum intensity value identification number in a look up table; and retrieving from said look up table a list of neighbors PMT intensityvalues based on said PMT maximum intensity value identification number.

4. The method of claim 3, further comprising the step of assembling said PMT maximum intensityvalue and said PMT maximum value identification number, and said list of PMT neighbors including their addresses and their intensity values so as to create data packets characterizing the distribution of the scintillation event.

5. The method of claim 1, wherein said plurality of PMTs are divided in eight said groups each said groups comprising eight said PMTs.

6. The method of claim 1, wherein step e) can be performed simultaneously with steps b) to d).

7. An apparatus for determining a centre PMT, from a plurality of PMTs, each said PMT for receiving scintillation light and generating an analog signal, said PMTs arranged in a planar array and outputting a set of PMT analog signals indicative of a scintillation event, the apparatus comprising:

means for converting said set of PMT analog signals into a set of PMT logical signals;

means for dividing said set of PMT logical signals into groups;

first comparison means for successively receiving said groups of said logical signals and combining said logical signals into pairs, comparing said paired signals, and outputting a local PMT highest intensity value for each said groups so as to obtain a subset of local PMT highest intensity values;

second comparison means for receiving said subset of local PMT highest intensity values, combining said subset of local PMT highest intensity values into pairs, comparing the paired values, and outputting the highest intensity values, until a PMT maximum intensity value representing said centre PMT is obtained.

8. The apparatus of claim 7, wherein data collected from two consecutive scintillation events can be simultaneously processed.

9. The apparatus of claim 7, further comprising means for defining an identification number of the centre PMT.

10. The apparatus of claim 9, further comprising means for storing said set of logical signals, all comparison results from said first and second comparison means, and said identification number of the centre PMT into a look up table and retrieving a list of neighbors intensity values from said look up table based on the identification number of said centre PMT.

11. The apparatus of claim 10, further comprising means for assembling the intensity value and the identification number of said centre PMT, and said identification numbers and intensity values of said PMTs included in said list of neighbors PMTs to create data packets characterizing the distribution of the scintillation event.

* * * * *